United States Patent
Choi

(10) Patent No.: US 6,172,603 B1
(45) Date of Patent: Jan. 9, 2001

(54) SHIFT STAGE DISPLAY DEVICE FOR AN AUTOMATIC TRANSMISSION OF A VEHICLE

(75) Inventor: Seok-Jin Choi, Suwon (KR)

(73) Assignee: Hyundai Motor Co., Seoul (KR)

( * ) Notice: Under 35 U.S.C. 154(b), the term of this patent shall be extended for 0 days.

(21) Appl. No.: 09/461,204

(22) Filed: Dec. 15, 1999

(30) Foreign Application Priority Data

Jun. 23, 1999 (KR) ................................................. 99-23644

(51) Int. Cl.[7] ................................................. B60Q 1/00
(52) U.S. Cl. ........................................... 340/456; 340/461
(58) Field of Search ....................................... 340/456, 461

(56) References Cited

U.S. PATENT DOCUMENTS

| | | | |
|---|---|---|---|
| 4,439,833 | * | 3/1984 | Yamaguchi et al. ............. 364/431.09 |
| 4,882,572 | * | 11/1989 | Lippmann et al. ................... 340/456 |
| 5,009,128 | * | 4/1991 | Seidel et al. ............................. 74/335 |
| 5,014,038 | * | 5/1991 | Leigh-monstevens et al. ..... 340/430 |
| 5,420,565 | * | 5/1995 | Holbrook ............................... 340/456 |
| 5,512,875 | * | 4/1996 | Polityka ................................. 340/456 |
| 5,526,261 | * | 6/1996 | Kallis et al. ........................... 364/424 |
| 5,847,344 | * | 12/1998 | Denyer et al. ..................... 200/61.88 |
| 5,861,803 | * | 1/1999 | Issa ........................................ 340/456 |
| 5,941,922 | * | 8/1999 | Price et al. .............................. 701/51 |

* cited by examiner

Primary Examiner—Daniel J. Wu
Assistant Examiner—Son Tang

(57) ABSTRACT

A shift stage display device for an automatic transmission of a vehicle includes a power supply for supplying stable power to a circuit while the vehicle is running; a control device for determining a shift stage according to running states of the vehicle to output a predetermined shift control signal; an interface circuit for controllably turning on and off a solenoid valve according to the control signal output from the control device to thereby output a predetermined signal corresponding to a shifting state of the running vehicle according to a prior established program; and a shift stage display for displaying each position of the shift stage of the running vehicle according to the predetermined signal output from the interface circuit, such that the ground of automated vehicle and the ground of the display device are separated, in order to preclude no influence of surge voltage, and to display at which speed the running shift range is in.

3 Claims, 1 Drawing Sheet

SHIFT STAGE DISPLAY DEVICE FOR AN AUTOMATIC TRANSMISSION OF A VEHICLE

BACKGROUND OF THE INVENTION

1. Field of the Invention

The present invention relates to an automatic transmission of a vehicle, and more particularly to a shift stage display device for an automatic transmission of a vehicle adapted to allow a driver to distinguish shift stages of the automatic transmission while running.

2. Description of the Prior Art

Generally, an automatic transmission of a vehicle is mounted with a transmission control unit (hereinafter referred to as TCU) for automatically adjusting a transmission ratio according to running speed and load of the vehicle.

The TCU controls a plurality of clutches mounted at a gear train and a brake in an actuation or non-actuation state to thereby adjust revolution at an output terminal of a planetary gear device.

In adjusting the revolutions at the output terminal, the TCU receives output signals of various sensors variably output according to running states of a vehicle to output to a solenoid valve for adjusting hydraulic pressure of a plurality of clutches provided at a gear train and the brake; said a transmission ratio duty control signal for shifting an automatic transmission without shifting shock according to given program execution steps, such that the solenoid valve is duty controlled and controllably turned on and off.

When a driver manipulates a shift lever after applying power to vehicles for running the vehicle with an automatic transmission, a current position of the shift lever is displayed on a cluster panel mounted in front of the driver by way of communications according to the prior art, such that the driver can locate where the shift lever is situated.

However, there is a problem in the prior art in that the current position of the change lever is only displayed according to changes of the change lever, per se; by the driver, while shifting change states of an automatic transmission cannot be determined in a running car. There is another problem in that a rapid countermeasure cannot be taken when there occurs a shift stage hold state caused by malfunction of a vehicle while the vehicle is shifted.

There present invention is provided to solve the aforementioned problems, and it is an object of the present invention to provide a shift stage display device for an automatic transmission of vehicle adapted to allow a driver to easily recognize a shifting progressive state while the vehicle is running.

SUMMARY OF THE INVENTION

In accordance with the object of the present invention, there is provided a shift stage display device for an automatic transmission of vehicle, the device comprising:

power supply means for supplying stable power to a circuit while the vehicle is running;

control means for determining a shift stage according to a running state of the vehicle to output a predetermined shift control signal;

an interface circuit for controllably turning on and off a solenoid valve according to the control signal output from the control means to thereby output a predetermined signal corresponding to a shift stage of the running vehicle according to prior established program; and shift stage display means for displaying each position of the shifting stage of the running vehicle according to the predetermined signal output from the interface circuit.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
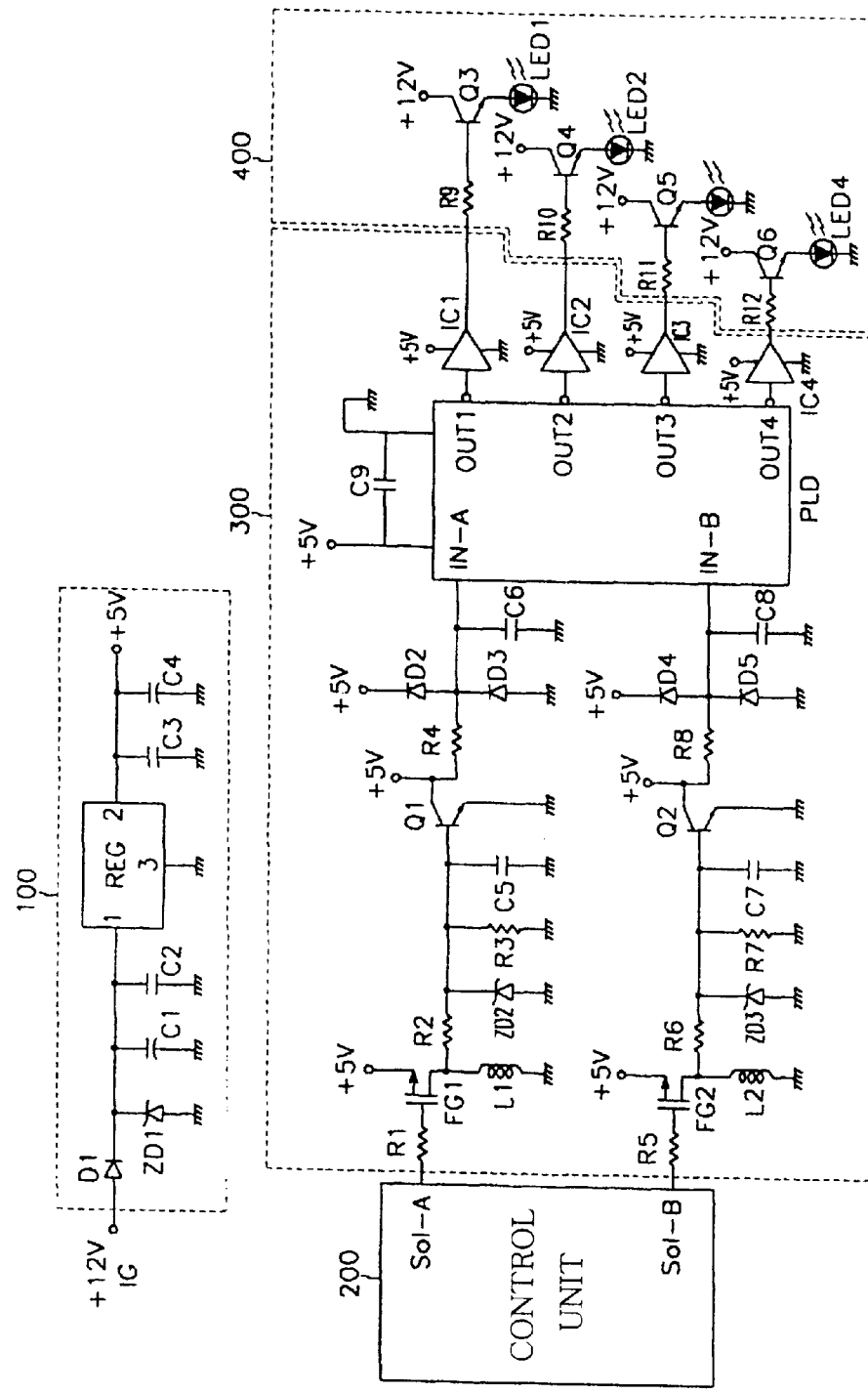
FIG. 1 is a circuit diagram of shift stage display device of an automatic transmission of a vehicle according to the present invention.

Preferred embodiment of the present invention will now be described in detail with reference to the accompanying drawing.

FIG. 1 is a circuit diagram of shift stage display device of an automatic transmission of a vehicle according to the present invention, where the device comprises: a power supply unit 100 for supplying stable power to a circuit while a vehicle is running; a control unit 200 for determining a shift stage according to a running state of the vehicle to output a predetermined shift control signal; an interface circuit 300 for controllably turning on and off a solenoid valve according to the control signal output from the control unit 200 to thereby output a predetermined signal corresponding to shifting stage of the running vehicle according to priorly a prior established program; and a shift stage display unit 400 for displaying each position of the shift stage of the running vehicle according to the predetermined signal output from the interface circuit 300.

The power supply unit 100 uses a regulator (REG) for supplying a voltage of +12V at an ignition state to the interface circuit 300 at voltage of +5V, where the power supply unit 100 includes a first zenor diode (ZD1) for preventing ON/OFF surge voltage which may happen while a vehicle is running, a first diode (D1) for protection of circuit relative to battery reverse connection, a first capacitor (C1) for adjusting alternating current AC ripples at ignition ON power and a second capacitor (C2) for bypass, a third capacitor (C3) having an excellent frequency characteristics and a fourth capacitor (C4) of rectifying capacitor for minimizing a drop of low drop voltage regulator.

The interface circuit 300 is provided with first and second field effect transistors FET (FG1 and FG2) for reversing signals output from solenoid A and B at a control unit 200. The FETs (FG1 and FG2) are arranged at drain terminals thereof with shift control solenoid valves (L1 and L2) turned on and off in accordance with ON/OFF operations of the first and second field effect transistors (FG1 and FG2). The interface circuit 300 is provided with second and third zener diodes (ZD2 and ZD3) for removing surge voltage included in applied voltage, first and second transistors (Q1 and Q2) for reversing input signals, fifth and seventh capacitors (C5 and C7) for bypass, second, third, fourth and fifth diodes (D2, D3, D4 and D5) for coupling an input voltage for stabilizing input signal and sixth and eighth capacitors (C6 and C8) for bypass.

The interface circuit 300 is also equipped with a Programmable Logic Device PLD for receiving a signal input from and reversed at the first transistor (Q1) and a signal input from and reversed at the second transistor (Q2) to output a predetermined signal to corresponding output terminal according to priorly established program, and first, second, third and fourth buffers (IC1, IC2, IC3 and IC4) for temporarily storing the signal output from the PLD.

The shift stage display unit 400 includes third, fourth, fifth and sixth transistors (Q3, Q4, Q5 and Q6) switching in accordance with the signal applied from the first, second, third and fourth buffers (IC1, IC2, IC3 and IC4) mounted at the interface circuit 300, and a display lamp (LED) for displaying corresponding shift stage when a transistor corresponding to a predetermined shift stage out of the third, fourth, fifth and sixth transistors (Q3, Q4, Q5 and Q6) is turned on.

Now, operation of the shift stage display device for automatic transmission of vehicle according to the present invention thus constructed will be described.

When power is applied to a vehicle, the control unit 200 uses a communication network to indicate a position of a shift lever on a random position of a cluster positioned in front of a driver.

At this time, the power supply unit 100 is mounted with a circuit having a regulator (REG) and a plurality of circuit elements in order to supply the interface circuit with +5V voltage by converted from the input vehicle battery voltage (+12V).

The first diode (D1) serves to prevent reverse voltage of the battery while the first zenor diode (ZD1) serves to prevent surge voltage. The first and second capacitors (C1 and C2) are used for ripple voltage control and for bypass.

Particularly, the regulator (REG) serves to prevent application of noise generated from the running state of the vehicle to the interface circuit because the regulator (REG) outputs the batter power of +12V in reduced voltage to a randomly set-up voltage where grounds at an input side and an output side of the circuit are separated.

Successively, when the driver changes the shift lever to a DRIVE range for driving the vehicle, the control unit 200 receives a vehicle speed and throttle opening changes (not shown) to determine an object shift stage and outputs a predetermined shift control signal for shifting the automatic transmission to the object shift stage.

In outputting a predetermined signal for shifting the automatic transmission to the object shift stage, the control unit 200 outputs to the solenoids (SOL, A and B) a signal for controlling the shift control valves (SCV, A and B) in order to change the shift stage of hydraulic circuit.

By this operation, the interface circuit 300 applies the signal output from A and B terminals of the solenoid at the control unit 200 to gates of the first and third field effect transistors (FG1 and FG3) via the first and fifth resistors (R1 and R5).

The signal input from the power supply unit 100 flows into a drain terminal via a source terminal to thereby control the first and second solenoid valves (L1 and L2) according to the signal input from the gates at the first and third field effect transistors (FG1 and FG3).

In other words, the first and second field effect transistors (FG1 and FG2) are turned on and off according to the signal output from the A and B terminals of the solenoid (SOL) at the control unit 200, and by this operation, the first and second transistors (Q1 and Q2) are turned on and off to thereby allow "high" or "low" signal to be input to IN-A and IN-B terminals of PLD.

At this time, the PLD controls the "high" or "low" signal thus input by way of priorly set-up program to cause a shift stage display signal to be output via a corresponding predetermined output terminal. The shift stage display signal output from the predetermined output terminal is output to the shift stage display unit 400 through buffers (IC1~IC4). The shift range display unit 400 receives the "high" or "low" signal output from the interface circuit 300 to turn on a certain transistor one of four transistors (Q3~Q6) and to light the display lamps (LED) connected to a collector terminal of the activated certain transistor for display of a present shift stage.

In other words, the shift stage is displayed through the display lamp turned on by the predetermined transistor controlled by the signal output from the output terminal (OUT) in accordance with control by the program previously set up at the PLD according to the signal output from the control unit 200, as shown in the table below.

TABLE

| SHIFT STAGE | SOL-A | SOL-B | IN-A | IN-B | OUT-1 | OUT-2 | OUT-3 | OUT-4 |
| --- | --- | --- | --- | --- | --- | --- | --- | --- |
| FIRST SPEED | H | H | H | H | H | L | L | L |
| SECOND SPEED | L | H | L | H | L | H | L | L |
| THIRD SPEED | L | L | L | L | L | L | H | L |
| FOURTH SPEED | H | L | H | L | L | L | L | H |

When a first speed signal is output from the control unit 200, the solenoids (SOL-A, B), respectively, output "high" signals, where, the first and second field effect transistors (FG1 and FG2) are deactivated to thereby turn off the first and second transistors (Q1 and Q2).

The power supply unit 100 is coupled to a collector terminal of the first and second terminal of the first and second transistors (Q1 and Q2) at the interface circuit 300 to cause the signal voltage of +5V to the PLD.

At this time, the PLD controls the power supplied to IN-A and IN-B terminals by way of the priorly set-up program to allow the shift stage display signal to be output to the shift stage display unit 400 via the output terminal (OUT).

The shift stage display unit 400 receives the shift stage display signal output from the output terminal (OUT) at the PLD of the interface circuit 300 to turn on the third transistor (Q3) corresponding to the first speed at the shift stage and to thereby light a first display lamp (LED1).

In case of a second speed at the shift stage, when a "low" signal from A terminal of the solenoid (SOL) at the control unit 200 and a "high" signal from B terminal are respectively output, the first field effect transistor (FG1) is rendered active while the second field effect transistor (FG2) is rendered inactive.

In accordance with activated first field effect transistor (FG1), the signal voltage supplied from the power supply unit 100 passes a source terminal to drive the first solenoid valve (L1) connected to a drain terminal, such that the first transistor (Q1) is rendered active to make the IN-A terminal of the PLD inactive.

At this time, the second transistor (Q2) maintaining an inactive state according to the second field effect transistor (FG2) keeps the inactivated state, and the PLD controls the power applied to the IN-B terminal by way of priorly set-up program to output a shift stage display signal to the shift stage display unit via an output terminal, where the shift stage display unit 400 receives the display signal to render the fourth transistor (Q4) to be active, such that the second display lamp (LED2) is lit to thereby allow the running shift stage to display a second speed.

In case of the shift stage being at the third speed, and "low" signals are respectively output from A and B terminals of the solenoid (SOL) at the control unit 200, the first and second field effect transistors (FG1 and FG2) are rendered active to make the signal voltage input from the power supply unit 100 drive the first and second solenoid valves (L1 and L2) connected to a drain terminal via a source terminal, such that the first and second transistor (Q1 and Q2) are turned on.

According as the first and second transistors (Q1 and Q2) are turned on, "low" signals are respectively applied to IN-A and IN-B input terminals of PLD. By this operation, the PLD output a shift stage display signal to the shift stage display unit 400 via the output terminal (OUT) by way of the priorly set-up program to turn on the corresponding fifth transistor (Q5), such that the third display lamp (LED3) is lit to display that the running shift stage is at the third speed.

In case the shift range is at the fourth speed, a "high" signal is output from the a terminal of the solenoid (SOL) at the control unit 200 and a "low" signal is output from the B terminal, where, the second transistor (Q3) is rendered active to maintain the first field effect transistor (FG1) at OFF state.

When the first transistor (Q1) is turned on, the signal voltage input from the power supply unit 100 drives the second solenoid valve (L2) connected to a drain terminal via a source terminal. Successively the second transistor (Q2) is rendered activated to cause the IN-B terminal of PLD to receive no signal voltage.

At this time, the first transistor (Q1) maintains OFF state according to the first field effect transistor (FG1) maintaining OFF state, and as a signal voltage of +5V is input to the IN-A terminal of PLD, the PLD outputs the signal voltage to the shift range display unit 400 via the output terminal (OUT) according to the priorly set-up program to turn on the sixth transistor (Q6), such that the fourth display lamp (LED4) is lit to let it known that the running shift stage is at the fourth speed.

As apparent from the foregoing, there is an advantage in the shift stage display device for an automatic transmission of a vehicle thus described according to the present invention in that the ground of the automated vehicle and the ground of the display device are separated, or order to receive no influence of surge voltage, and to display which speed the running shift stage is at, such that driving convenience is provided to allow a driver to swiftly recognize a fixed third speed during glitches of the transmission for rapid maintenance thereof.

What is claimed is:

1. A shift stage display device for an automatic transmission of a vehicle, the device comprising:

power supply means for supplying stable power to a circuit while the vehicle is running;

control means for determining a shift stage according to a running state of the vehicle to output a predetermined shift control signal;

an interface circuit for controllably turning on and off a solenoid valve according to the control signal output from the control means to thereby output a predetermined signal corresponding to a shift stage state of the running vehicle according to a prior established program;

said interface circuit including:

field effect transistors for repeating ON/OFF operations according to the shift control signal output from the control means to reverse the signal and to output the same, additional transistors for repeating ON/OFF operations according to the signal reversed by the field effect transistors, and for reversing the signal to output the same thereafter, a programmable logic device for receiving the signal output from the additional transistors to output a shift stage display signal to corresponding output terminal according to the prior set-up program, and a buffer for temporarily storing the shift stage display signal output from the programmable logic device to output same to the shift stage display means; and shift stage display means for displaying each shift stage state of the running vehicle according to the predetermined signal output from the interface circuit.

2. The device as defined in claim 1, wherein the field effect transistors comprise a first and second field effect transistors.

3. The device as defined in claim 1, wherein the additional transistors comprise a first and second transistors.

* * * * *